United States Patent
Kawata

[11] Patent Number: 6,061,113
[45] Date of Patent: May 9, 2000

[54] OPTICAL COMPENSATORY SHEET HAVING AN ORIENTATION LAYER ACTIVATED BY IRRADIATION OF LIGHT, PROCESS AND PREPARATION OF THE SAME AND LIQUID CRYSTAL DISPLAY

[75] Inventor: Ken Kawata, Kanagawa, Japan

[73] Assignee: Fuji Photo Film Co., Ltd., Minami-Ashigara, Japan

[21] Appl. No.: 09/020,404

[22] Filed: Feb. 9, 1998

[30] Foreign Application Priority Data

Feb. 7, 1997 [JP] Japan ................................. 9-024750

[51] Int. Cl.$^7$ ...................... G02F 1/1335; G02F 1/3337; C09K 19/00
[52] U.S. Cl. ............................. 349/117; 349/123; 428/1
[58] Field of Search ................... 349/117, 118, 349/120, 121, 177, 123, 124; 428/1; 359/494, 500

[56] References Cited

U.S. PATENT DOCUMENTS

| | | | |
|---|---|---|---|
| 5,296,321 | 3/1994 | Kawanishi et al. | 430/20 |
| 5,389,698 | 2/1995 | Chigrinov et al. | 522/2 |
| 5,518,783 | 5/1996 | Kawata et al. | 428/1 |
| 5,583,679 | 12/1996 | Ito et al. | 349/118 |
| 5,607,732 | 3/1997 | Miyamoto et al. | 428/1 |
| 5,631,051 | 5/1997 | Ito | 428/1 |
| 5,635,105 | 6/1997 | Kawata et al. | 252/299.01 |
| 5,644,416 | 7/1997 | Morikawa et al. | 349/86 |
| 5,718,838 | 2/1998 | Okazaki | 252/299.01 |
| 5,730,900 | 3/1998 | Kawata | 252/299.01 |
| 5,736,067 | 4/1998 | Kawata et al. | 252/299.5 |
| 5,805,253 | 9/1998 | Mori et al. | 349/118 |
| 5,818,560 | 10/1998 | Kouno et al. | 349/129 |
| 5,949,509 | 9/1999 | Ohe et al. | 349/123 |

*Primary Examiner*—William L. Sikes
*Assistant Examiner*—Tarifur R. Chowdhury
*Attorney, Agent, or Firm*—Burns, Doane, Swecker & Mathis, LLP

[57] ABSTRACT

An optical compensatory sheet comprises a transparent support, an orientation layer and an optically anisotropic layer in order. The optically anisotropic layer contains an aligned and fixed discotic liquid crystal compound. The orientation layer has a function of aligning the discotic liquid crystal compound. The function of the orientation layer is activated by irradiating the layer with light from a single direction. The present specification also discloses a process for the preparation of the optical compensatory sheet and a liquid crystal display using the optical compensatory sheet.

17 Claims, 2 Drawing Sheets

OPTICAL COMPENSATORY SHEET HAVING AN ORIENTATION LAYER ACTIVATED BY IRRADIATION OF LIGHT, PROCESS AND PREPARATION OF THE SAME AND LIQUID CRYSTAL DISPLAY

FIELD OF THE INVENTION

The present invention relates to an optical compensatory sheet comprising a transparent support, an orientation layer and an optically anisotropic layer containing an aligned and fixed discotic liquid crystal compound in order. The invention also relates to a process for the preparation of the optical compensatory sheet and a liquid crystal display using the optical compensatory sheet.

BACKGROUND OF THE INVENTION

A liquid crystal display comprises a liquid crystal cell, a polarizing sheet and an optical compensatory sheet (phase retarder) provided between the liquid crystal cell and the polarizing sheet.

The liquid crystal cell comprises a pair of substrates, a rod-like liquid crystal compound and an electrode layer. The rod-like liquid crystal compound is provided between the substrates. The electrode layer has a function of applying a voltage to the rod-like liquid crystal compound. Each of the substrates has an orientation layer (both-sided orientation layers), which has a function of aligning the rod-like liquid crystal compound. The orientation layer of the liquid crystal cell is usually prepared by forming a polymer (e.g., polyimide, polyvinyl alcohol) membrane on the substrate, and rubbing the membrane with a cloth uniformly.

The optical compensatory sheet is a birefringent film having a function of removing color from an image displayed in liquid crystal. A stretched birefringent resin film has usually been used as the optical compensatory sheet.

It has been proposed to use an optically anisotropic element as the optical compensatory sheet in place of the stretched birefringent film. The optically anisotropic element is formed by fixing an aligned liquid crystal compound. Liquid crystal compounds have various alignment forms. Therefore, an optically anisotropic element obtained by fixing an alignment form can have a specific optical characteristic that cannot be obtained by the conventional stretched birefringent film.

Japanese Patent Provisional Publication No. 3(1991)-87720 discloses an optical compensatory sheet of a liquid crystal display. The optical compensatory sheet is made of an aligned membrane of a twisted nematic phase. The optical compensatory sheet uses a rod-like liquid crystal compound, which is similar to a liquid crystal compound used in a liquid crystal cell. Japanese Patent Provisional Publication No. 5(1993)-215921 discloses an optical compensatory sheet comprising a rod-like compound provided between a pair of substrates, which have been subjected to an alignment treatment. The rod-like compound shows a liquid crystal characteristic after hardening the compound.

However, the requirements of the optical compensatory sheet about the characteristics of the liquid crystal compound and the orientation layer are completely different from the requirements of the liquid crystal cell.

For example, the optical compensatory sheet requires an effect of enlarging viewing angle. However, the effect of the rod-like liquid crystal compound used in the liquid crystal cell is insufficient. Further, the optical compensatory sheet uses the liquid crystal compound fixed as an aligned state. However, the alignment of the rod-like liquid crystal compound is not stable. Further, the rod-like liquid crystal compound used in the liquid crystal cell is not sufficiently aligned on one orientation layer (single-sided orientation layer) provided on a substrate (support). Since the liquid crystal cell has a pair of substrates between which the rod-like liquid crystal compound is provided, an orientation layer can be provided each of the substrates (both-sided orientation layers). If an optically compensatory sheet has the both-sided orientation layers similarly to the liquid crystal cell, as is described in Japanese Patent Provisional Publication No. 5(1993)-215921, the total weight of the liquid crystal display device is greatly increased.

For the reasons mentioned above, the liquid crystal compound and the orientation layer for the optical compensatory sheet have been researched and developed independently to the liquid crystal compound and the orientation layer for the liquid crystal cell.

With respect to the liquid crystal compound for the optical compensatory sheet, it has recently been proposed to use a discotic liquid crystal compound in place of a rod-like liquid crystal compound. The viewing angle of the liquid crystal display can greatly be enlarged by using the discotic liquid crystal compound in the optical compensatory sheet. Further, the alignment of the discotic liquid crystal compound is stable, compared with the rod-like discotic liquid crystal compound. Japanese Patent Provisional Publication No. 8(1996)-27284 proposes further stabilizing the alignment of the discotic liquid crystal compound by introducing a polymerizable group to the compound and polymerizing the compound after the alignment.

With respect to the orientation layer for the optical compensatory sheet, a single-sided orientation layer has been proposed to control the alignment of the discotic liquid crystal compound. Japanese Patent Provisional Publication No. 7(1995)-146409 discloses an obliquely evaporated silicon oxide (SiO) membrane, which can be used as a single-sided orientation layer in place of a conventional orientation layer obtained by a rubbing method. Japanese Patent Provisional Publication No. 7(1995)-281028 discloses a rubbed polyimide membrane used as the single-sided orientation layer.

SUMMARY OF THE INVENTION

An optical compensatory sheet reduced in alignment defects (in other words, having a high optical purity) can be obtained by using the obliquely evaporated silicon oxide (SiO) membrane disclosed in Japanese Patent Provisional Publication No. 7(1995)-146409 as the single-sided orientation layer because the membrane does not make rubbing dust. However, the obliquely evaporated silicon oxide membrane is not appropriate for mass production. For the mass production of the optical compensatory sheet, the orientation layer should continuously be formed on a continuous transparent support. It is technically difficult to form the evaporated membrane continuously.

Further, the continuously prepared optical compensatory sheet is then cut along the optical axis. If the optical axis is not parallel to the longitudinal direction of the continuous sheet, a waste portion is caused by cutting the sheet. The waste portion is enlarged by increasing the angle between the optical axis and the longitudinal direction. It is very difficult for the orientation layer used in the optical compensatory sheet to adjust the optical axis precisely.

An object of the present invention is to provide an optical compensatory sheet having a high optical purity, appropriate for mass production.

Another object of the invention is to provide an optical compensatory sheet that can easily adjust the optical axis.

A further object of the invention is to provide a process for the preparation of the improved optical compensatory sheet and a liquid crystal display using the improved optical compensatory sheet.

The present inventor has noted an orientation layer activated by irradiation of light, which is completely different from the orientation layer used in the conventional optical compensatory sheet. The orientation layer activated by light irradiation has been proposed as an orientation layer of a liquid crystal cell (Articles of Polymer (written in Japanese), vol. 47, No. 10, page 771 (1990); Langmuir, vol. 8, No. 3, page 1007 (1992); Liquid Crystals, vol. 13, No. 2, page 189 (1993); and Japanese Patent Publication Nos. 7(1995)-92567 and 7(1995)-101264).

However, the orientation layer activated by light irradiation has a problem that the aligning function of the layer is weak and unstable. Accordingly, the orientation layer activated by light irradiation for the liquid crystal cell is still in the experimental stage, and does not reach the practical stage. On the contrary, Japanese Patent Provisional Publication No. 5(1993)-241151 describes that a liquid crystal cell having the orientation layer activated by light irradiation can be used as a rewritable optical recording medium by using the unstable (reversible) aligning function.

Since the alignment of the liquid crystal compound is fixed in the optical compensatory sheet, the optical compensatory sheet requires a stable aligning function of the orientation layer in principle, compared with the liquid crystal cell. Since a single-sided orientation layer is preferably used in the optical compensatory sheet, the optical compensatory sheet requires a stable aligning function of the orientation layer in principle, compared with the liquid crystal cell, which has double-sided orientation layers. In view of the above-mentioned principles, it has not been considered to use the orientation layer activated by light irradiation in the optical compensatory sheet.

However, the present inventor surprisingly finds that the orientation layer activated by light irradiation can advantageously be used in the optical compensatory sheet.

The present invention provides an optical compensatory sheet comprising a transparent support, an orientation layer and an optically anisotropic layer in order, said optically anisotropic layer containing an aligned and fixed discotic liquid crystal compound, and said orientation layer having a function of aligning the discotic liquid crystal compound, wherein the function of the orientation layer is activated by irradiating the layer with light applied in a single direction.

The invention also provides an optical compensatory sheet comprising a transparent support, an orientation layer and an optically anisotropic layer in order, said orientation layer containing a photochromic compound or a light-sensitive polymer, and said optically anisotropic layer containing an aligned and fixed discotic liquid crystal compound.

The invention further provides a process for the preparation of an optical compensatory sheet, which comprises the steps in order of:

(1) forming a layer containing a photochromic compound or a light-sensitive polymer on a transparent support;

(2) irradiating the layer containing the photochromic compound or the light-sensitive polymer with light applied in a single direction;

(3) forming a layer containing a discotic liquid crystal compound having a polymerizable group and a photo polymerization initiator on the layer containing the photochromic compound or the light-sensitive polymer; and (4) irradiating the layer containing the discotic liquid crystal compound and the photo polymerization initiator with light.

The invention furthermore provides a liquid crystal display comprising a liquid crystal cell, a polarizing sheet and an optical compensatory sheet provided between the liquid crystal cell and the polarizing sheet, wherein the optical compensatory sheet comprises a transparent support, an orientation layer and an optically anisotropic layer in order, said optically anisotropic layer containing an aligned and fixed discotic liquid crystal compound, and said orientation layer having a function of aligning the discotic liquid crystal compound, and wherein the function of the orientation layer is activated by irradiating the layer with light applied in a single direction.

According to study of the present inventor, an alignment of a discotic liquid crystal compound can be fixed, even though the aligning function of the orientation layer activated by light irradiation is weak and unstable. The discotic liquid crystal compound can be sufficiently aligned even on a single-sided orientation layer of the weak function. Further, the alignment of the discotic liquid crystal compound can be kept for a short time between the light irradiation and the fixing treatment because the alignment of the discotic liquid crystal compound has a high stability. After fixing the alignment of the discotic liquid crystal compound, the aligned compound keeps the function of the orientation layer.

An optical compensatory sheet having a high optical purity and few alignment defects can be obtained by using the orientation layer activated by light irradiation. Further, light irradiation is appropriate for mass production because a large area can simultaneously be irradiated with light. Further, it is easy to adjust the optical axis of the optical compensatory sheet because light irradiation can precisely be conducted from a single direction.

For the reasons mentioned above, an orientation layer activated by light irradiation can advantageously be used in an optical compensatory sheet.

The discotic liquid crystal compound is usually fixed by a photo polymerization reaction using a photo polymerization initiator. Use of an orientation layer activated by light irradiation causes a problem about the relation between the light irradiation for activating an orientation layer and the light irradiation for the photo polymerization. The two light irradiation procedures can be conducted according to the above-mentioned process without causing the problem.

DETAILED DESCRIPTION OF THE INVENTION

[Layered Structure and Preparing Steps]

The layered structure of the optical compensatory sheet and the preparing steps are described below referring to the drawings.

The optical compensatory sheet is preferably prepared by a process comprising the following steps:

First step: forming a layer containing a photochromic compound or a light-sensitive polymer on a transparent support;

Second step: irradiating the layer containing the photochromic compound or the light-sensitive polymer with light applied in a single direction;

Third step: forming a layer containing a discotic liquid crystal compound having a polymerizable group and a photo polymerization initiator on the layer containing the photochromic compound or the light-sensitive polymer; and Fourth step: irradiating the layer containing the discotic liquid crystal compound and the photo polymerization initiator with light.

Figure 1:
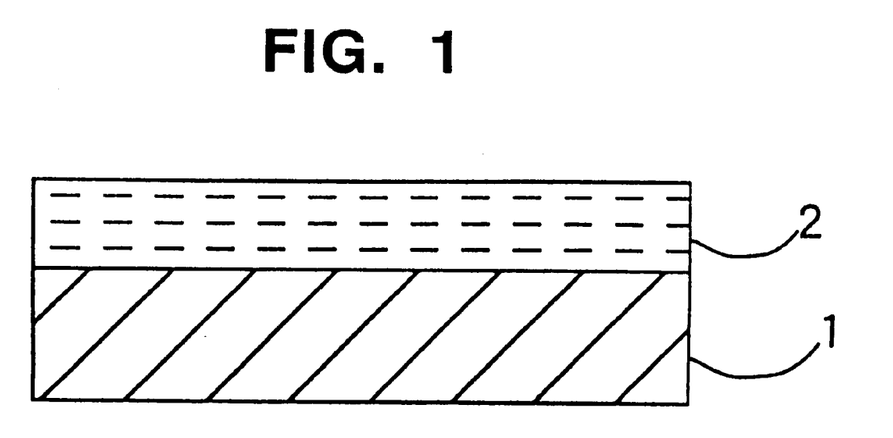
FIG. 1 is a sectional view schematically showing the stage after the first step of the process for the preparation of the optical compensatory sheet.

FIG. 1 is a sectional view schematically showing the stage after the first step of the process for the preparation of the optical compensatory sheet.

As is shown in FIG. 1, a layer containing a photochromic compound or a light-sensitive polymer (2) is formed on a transparent support (1). The formed layer (2) does not have a function of aligning a discotic liquid crystal compound yet.

Figure 2:
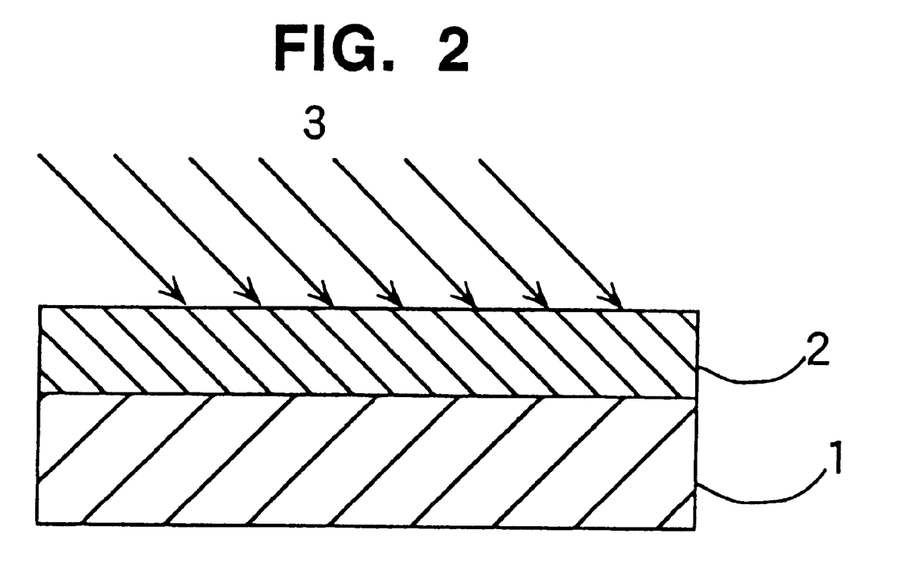
FIG. 2 is a sectional view schematically showing the stage after the second step of the process for the preparation of the optical compensatory sheet.

FIG. 2 is a sectional view schematically showing the stage after the second step of the process for the preparation of the optical compensatory sheet.

As is shown in FIG. 2, the layer containing the photochromic compound or the light-sensitive polymer (2) is irradiated with light (3) applied in a single direction. Light (3) activates the function of aligning a discotic liquid crystal compound to change the layer to an orientation layer.

Figure 3:
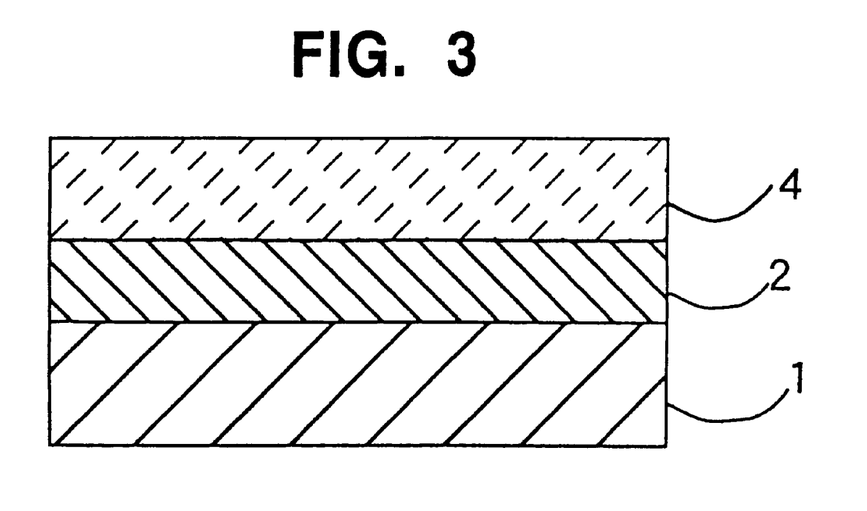
FIG. 3 is a sectional view schematically showing the stage after the third step of the process for the preparation of the optical compensatory sheet.

FIG. 3 is a sectional view schematically showing the stage after the third step of the process for the preparation of the optical compensatory sheet.

As is shown in FIG. 3, a layer containing a discotic liquid crystal compound having a polymerizable group and a photo polymerization initiator (4) is formed on the orientation layer (2). The discotic liquid crystal compound is aligned at a temperature of a discotic nematic liquid crystal phase. However, the alignment is not fixed yet.

Figure 4:
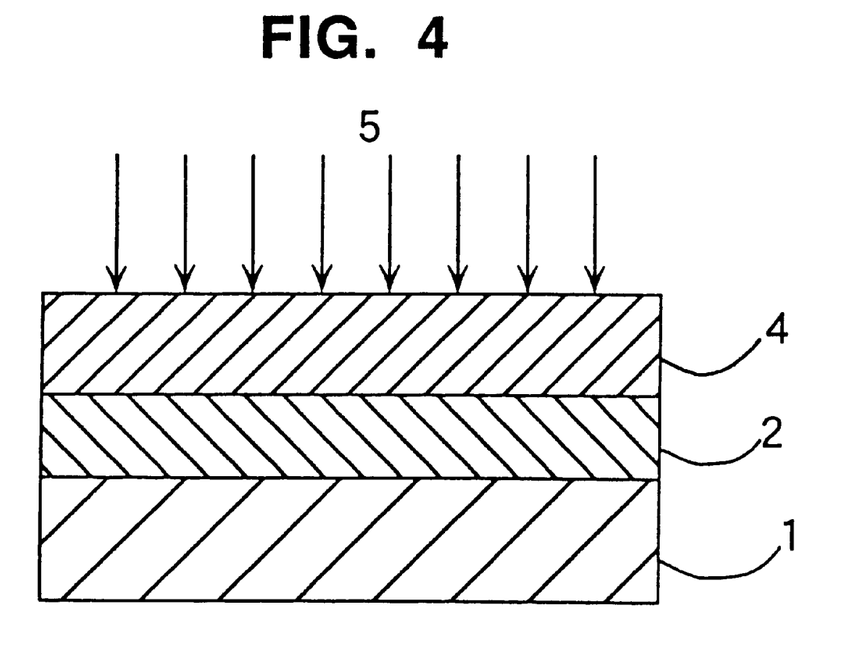
FIG. 4 is a sectional view schematically showing the stage after the fourth step of the process for the preparation of the optical compensatory sheet.

FIG. 4 is a sectional view schematically showing the stage after the fourth step of the process for the preparation of the optical compensatory sheet.

As is shown in FIG. 4, the layer containing the discotic liquid crystal compound and the photo polymerization initiator (4) is irradiated with light (5) to fix the alignment of the discotic liquid crystal compound.

[Transparent Support]

A transparent support can be made of a plastic film, a glass (quartz glass) plate or a metal film. A plastic film is preferably used to reduce the total weight of the liquid crystal display device. Examples of the plastic materials include cellulose ester (e.g., cellulose triacetate), polycarbonate, polyarylate, polysulfone and polyethersulfone. The transparent support is preferably in the form of a continuous (rolled) film.

The transparent support has a thickness preferably in the range of 20 to 500 $\mu$m, and more preferably in the range of 50 to 200 $\mu$m.

An undercoating layer can be provided between the transparent support and the orientation layer. The undercoating layer contains a hydrophilic polymer (e.g., gelatin, polyvinyl alcohol).

The undercoating layer has a thickness preferably in the range of 0.1 to 2 $\mu$m, and more preferably in the range of 0.2 to 1 $\mu$m.

[Orientation Layer]

An orientation layer activated by light irradiation can be formed by using a photochromic compound or a light-sensitive polymer.

The photochromic compound has a chemical structure that can be changed by a function of light. As the chemical structure is changed, the characteristic to light (e.g., color tone) is also changed. These changes are generally reversible.

The proposed photochromic compounds for liquid crystal cells include azobenzene compounds (K. Ichimura et al., Langmuir, vol. 4, page 1214 (1988); K. Aoki et al., Langmuir, vol. 8, page 1007 (1992); Y. Suzuki et al., Langmuir, vol. 8, page 2601 (1992); K. Ichimura et al., Appl. Phys. Lett., vol. 63, No. 4, page 449 (1993); N. Ishizuki, Langmuir, vol. 9, page 3298 (1993); N. Ishizuki, Langmuir, vol. 9, page 857 (1993)), hydrazono-β-ketoester compounds (S. Yamamura et al., Liquid Crystals, vol. 13, No. 2, page 189 (1993)), stilbene compounds (Kunihiro Ichimura et al. Articles of Polymer (written in Japanese), vol. 47, No. 10, page 771 (1990)) and spiropyran compounds (K. Ichimura et al., Chemistry Letters, page 1063 (1992); K. Ichimura et al., Thin Solid Films, vol. 235, page 101 (1993)).

The optical compensatory sheet preferably uses a photochromic compound having a double bond structure of C=C, C=N or N=N. The photochromic compound having the double bond structure comprises the following essential elements (1) and (2) and the following optional elements (3) to (5):

(1) A double bond structure of C=C, C=N or N=N;

(2) Cyclic structures attached (directly or not directly) to the both sides of the double bond structure (1);

(3) An optional linking group between (1) and (2);

(4) An optional substituent group for the carbon atom of (1); and (5) An optional substituent group for the cyclic structures (2).

The double bond structure (1) preferably has a transform. Two or more double bond structures can be present in the molecule of the photochromic compound. The two or more double bond structures are preferably conjugated.

Examples of the cyclic structures (2) include benzene ring, naphthalene ring and nitrogen-containing heterocyclic rings (e.g., pyridinium ring, benzopyridinium ring). Carbon atom (not nitrogen atom) of the heterocyclic ring is preferably combined to carbon atom or nitrogen atom of the double bond structure (1).

Examples of the linking groups (3) include —NH— and —CO—. However, the structures (1) and (2) are preferably directly combined to each other without the linking group (3).

Examples of the substituent groups (4) include an aryl group (e.g., phenyl) and cyano. However, carbon atom of the structure (1) preferably has no substituent groups (namely —CH=CH— or —CH=N—).

Examples of the substituent groups (5) include an alkoxy group (e.g., methoxy, hexyloxy), cyano, an alkyl group (e.g., butyl, hexyl) and an alkylamino group (e.g., dimethylamino). In the case that the cyclic structure (2) is benzene ring, the substituent group is preferably attached to the para-position of the benzene ring. In the case that the photochromic compound is chemically bound to a polymer as is described below, a functional group for the chemical bond is introduced into the photochromic compound as the substituent group (5).

The photochromic compound is fixed to the surface of the transparent support to form the orientation layer. The methods of fixing the photochromic compound include: (a) coating a mixture of the photochromic compound and a polymer on the support; (b) chemically binding the photochromic compound to a polymer; (c) causing adsorption of the photochromic compound on the surface of the support: and (d) chemically binding the photochromic compound to the surface of the support.

With respect to the liquid crystal cell, the photochromic compound was usually adsorbed on or bound to a surface of a quartz glass plate substrate of the cell according to the method (c) or (d). However, a plastic film support rather than glass plate is preferably used as the support of the optical compensatory sheet to reduce the weight of the display device. Accordingly, the method (a) or (b) is preferably used for the preparation of the optical compensatory sheet. The method (b) is more preferably used to fix the photochromic compound tightly.

The polymer used in the method (a) or (b) preferably is a hydrophilic polymer (e.g., gelatin, polyvinyl alcohol). Polyvinyl alcohol is most preferably used.

The chemical reaction of the method (b) between the photochromic compound and the polymer is determined according to the nature (particularly the nature of the functional group) of the polymer. In the case that a polymer has hydroxyl group (such as polyvinyl alcohol), the photochromic compound can be combined to the polymer by a reaction between an acid halide and hydroxyl group. In more detail, a halogenated acyl group (—COX, wherein X is halogen atom) is introduced into a photochromic compound as a substituent group, and then the compound is combined to the polymer by the following reaction between the halogenated acyl group and hydroxyl group of the polymer.

Ph-COX+HO-Pl→Ph-CO—O-Pl+HX in which Ph is a photochromic compound, and Pl is the main chain of the polymer.

The light-sensitive polymer can be classified into a photo isomerization polymer, a photo dimerization polymer and a photo decomposition polymer.

The above-mentioned polymer binding a photochromic compound is a representative example of (substantially identical to) the photo isomerization polymer. An example of the photo dimerization polymer is polyvinyl cinnamate. An example of the photo decomposition polymer is polyimide. The photo decomposition type polyimide is described in Japanese Patent Provisional Publication Nos. 5(1993)-34699, 6(1994)-289399, 8(1996)-122792 and Manuscripts (written in Japanese) of a lecture for liquid crystal discussion No. 21, page 1672A17 (1996).

A layer can be formed by dissolving or dispersing the photochromic compound or the light-sensitive polymer a solvent, and coating the solution or dispersion on the transparent support. The components of the orientation layer preferably have no liquid crystal characteristics.

The layer containing the photochromic compound or the light-sensitive polymer has a thickness preferably in the range of 0.1 to 5 μm, and more preferably in the range of to 0.2 to 2 μm.

After forming the layer containing the photochromic compound or the light-sensitive polymer, the layer is irradiated with light applied in a single direction to activate the aligning function of the layer. X-ray, an electron beam, an ultraviolet ray, visible light or an infrared ray (heat ray) can be used at the light irradiation. The ultraviolet ray is preferably used. Examples of the light sources include a low pressure mercury lamp (sterilization lamp, fluorescent chemical lamp, black light), a high pressure discharge lamp (high pressure mercury lamp, metal halide lamp) and a short arc discharge lamp (ultra high pressure mercury lamp, xenon lamp, mercury xenon lamp).

Light is arranged to a single direction as possible. The single direction means that the direction of light projected on the surface plane of the layer is identical. The single direction include a direction parallel or perpendicular to the surface plane of the layer. The direction of light is preferably so adjusted that the optical axis of the prepared continuous optical compensatory sheet is parallel to the longitudinal direction of the continuous sheet. The direction of the light irradiation is usually different from the longitudinal direction to adjust the optical axis as is mentioned above. The angle between the two directions is determined by the relation between the orientation layer and the discotic liquid crystal compound.

According to prior art about the liquid crystal cell, the light irradiation was conducted after forming a liquid crystal layer between the double-sided orientation layers. Accordingly, the layer was irradiated with light through the substrates (supports) of the cell. On the other hand, it is possible and preferred for the preparation of the optical compensatory sheet to conduct the light irradiation before forming a layer containing a discotic liquid crystal compound. Accordingly, the layer containing the photochromic compound or the light-sensitive polymer can be irradiated with light directly (not through the support) applied in a single direction over the layer. The prior art about the liquid crystal cell usually used linear polarized light. On the other hand, natural (not polarized) light can be used in the preparation of the optical compensatory sheet.

The amount of the exposure is preferably in the range of 2,000 to 6,000 MJ/cm$^2$, more preferably in the range of 3,000 to 5,000 mJ/cm$^2$, and most preferably about 4,000 MJ/cm$^2$. The light irradiation can be conducted while heating the layer to activate the aligning function for a short time. The heating temperature is preferably in the range of 40° to 250° C.

[Optically Anisotropic Layer]

An optically anisotropic layer is formed by aligning a discotic liquid crystal compound by the orientation layer, and fixing the alignment of the discotic liquid crystal compound. The discotic liquid crystal compound is fixed preferably by a polymerization reaction.

The discotic liquid crystal compound is described in various documents (C. Destrade et al., Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994)). The polymerization reaction of the discotic liquid crystal compound is described in Japanese Patent Provisional Publication No. 8(1996)-27284.

A polymerizable group should be bound to a discotic core of the discotic liquid crystal compound to cause the polymerization reaction of the compound. However, if the polymerizable group is directly bound to the discotic core, it is difficult to keep the alignment at the polymerization reaction. Therefore, a linking group is introduced between the discotic core and the polymerizable group. Accordingly, the discotic liquid crystal compound having a polymerizable group preferably is a compound represented by the following formula (I).

$$D(\text{—L—P})_n \quad (I)$$

in which D is a discotic core; L is a divalent linking group; P is a polymerizable group; and n is an integer of 4 to 12.

Examples of the discotic cores (D) are shown below. In the examples, LP (or PL) means the combination of the divalent linking group (L) and the polymerizable group (P).

In the formula (I), the divalent linking group (L) preferably is selected from the group consisting of an alkylene group, an arylene group, —CO—, —NH—, —O—, —S— and combinations thereof. L more preferably is a divalent linking group comprising at least two divalent groups selected from the group consisting of an alkylene group, an arylene group, —CO—, —NH—, —O— and —S—. L more preferably is a divalent linking group comprising at least two divalent groups selected from the group consisting of an alkylene group, an arylene group, —CO— and —O—. The alkylene group preferably has 1 to 12 carbon atoms. The arylene group preferably has 6 to 10 carbon atoms.

Examples of the divalent linking groups (L) are shown below. In the examples, the left side is attached to the discotic core (D), and the right side is attached to the polymerizable group (P).

L1: -alkylene-CO—O-alkylene-O—CO—
L2: -alkylene-CO—O-alkylene-O—

L3: -alkylene-CO—O-alkylene-O-alkylene-
L4: -alkylene-CO—O-alkylene-
L5: —O-alkylene-O—CO—
L6: —O-alkylene-O—
L7: —O-alkylene-O—CO—NH-alkylene-
L8: —O-alkylene-S-alkylene-
L9: —O-alkylene-
L10: —CO-arylene-O-alkylene-O—CO—
L11: —CO-arylene-O-alkylene-
L12: —CO-arylene-O-alkylene-O—
L13: —CO—NH-alkylene-
L14: —NH-alkylene-O—CO—
L15: —NH-alkylene-O—
L16: —S-alkylene-S-alkylene-
L17: —S-alkylene-
L18: —S-alkylene-O—
L19: —O—CO-arylene-alkylene-O—CO—

The polymerizable group (P) is determined by the polymerization reaction. Examples of the polymerizable groups (P) are shown below.

The polymerizable group (P) preferably is an unsaturated polymerizable group (P1, P2, P3, P7, P8) or a group (P6), more preferably is an unsaturated polymerizable group, and most preferably is an ethylenically unsaturated group (P1, P7, P8).

In the formula (I), n is an integer of 4 to 12, which is determined by the chemical structure of the discotic core (D). The 4 to 12 combinations of L and P can be different from each other. However, the combinations are preferably identical.

A rod-like liquid crystal compound and other low or high molecular compounds can be mixed with the discotic liquid crystal compound to adjust the liquid crystal phase or the alignment temperature or to accelerate or inhibit the polymerization reaction. The ratio of the discotic liquid crystal compound in the mixture is preferably not smaller than 50 wt. %, and more preferably not smaller than 80 wt. %.

A layer containing the discotic liquid crystal compound can be formed by coating a solution containing the discotic liquid crystal compound, a polymerization initiator and other optional components on the orientation layer.

The layer containing the discotic liquid crystal compound has a thickness preferably in the range of 0.5 to 100 $\mu$m, and more preferably in the range of 0.5 to 30 $\mu$m.

The discotic liquid crystal phase can be classified into a columnar phase, a discotic nematic phase and a chiral discotic nematic phase. In the columnar phase, discotic cores are piled up like a column by an intermolecular force. In the discotic nematic phase, optical axes of discotic cores are paralleled while the gravity centers of the cores are irregularly agglomerated. The chiral discotic nematic phase is similar to the cholesteric phase of a rod-like liquid crystal compound. In the optical compensatory sheet, the discotic liquid crystal compound is preferably in the form of the discotic nematic phase.

The molecules of the liquid crystal compounds should be statistically arranged along a single direction to use the compound in the optical compensatory sheet. The discotic liquid crystal compound comprises microscopic aligned domains, each of which has a specific oriented direction. The discotic liquid crystal compound also forms a thermally stable macroscopic multi-domain, which does not show an optical anisotropy. Accordingly, the discotic liquid crystal compound provided on an optically isotropic support does not show an optical anisotropy. The orientation layer is the element that activates the mono-domain characteristic of the discotic liquid crystal compound.

The discotic liquid crystal compound forms a discotic nematic phase by the function of the orientation layer usually at a temperature of not lower than 70° C. (preferably 70 to 300° C., and more preferably 70 to 170° C. Accordingly, the discotic liquid crystal compound is preferably heated at a temperature of not lower than 70° C. to align the compound. The heating procedure is preferably conducted while the surface of the layer containing the discotic liquid crystal compound has a free interface (while the surface is not completely dried).

The alignment of the discotic liquid crystal compound is formed along a single direction on a plane. However, the alignment can be changed along the perpendicular direction. For example, the discotic liquid crystal compound can have a hybrid alignment in which the direction of the alignment is gradually changed from the surface of the orientation layer to the surface of the optically anisotropic layer.

The aligned discotic liquid crystal compound is fixed while keeping the alignment. The compound is fixed preferably by a polymerization reaction. The polymerization reaction can be classified a thermal reaction using a thermal polymerization initiator and a photo reaction using a photo polymerization initiator. A photo polymerization reaction is preferred.

Examples of the photo polymerization initiators include $\alpha$-carbonyl compounds (described in U.S. Pat. Nos. 2,367, 661, 2,367,670), acyloin ethers (described in U.S. Pat. No. 2,448,828), $\alpha$-hydrocarbon substituted acyloin compounds (described in U.S. Pat. No. 2,722,512), polycyclic quinone compounds (described in U.S. Pat. Nos. 2,951,758, 3,046, 127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution of the layer.

The light irradiation for the photo polymerization is preferably conducted by an ultraviolet ray. In contrast to the formation of the orientation layer, it is not necessary to emit light from a single direction. The whole surface of the layer containing the discotic liquid crystal compound is irradiated with light of energy required for the polymerization reaction.

The exposure energy is preferably in the range of 20 to 5,000 mJ, and more preferably in the range of 100 to 800 mJ. The light irradiation can be conducted while heating the layer to accelerate the photo polymerization reaction.

[Liquid Crystal Display]

A liquid crystal display comprises a liquid crystal cell, a polarizing sheet and an optical compensatory sheet provided between the liquid crystal cell and the polarizing sheet.

The liquid crystal cell comprises a pair of substrates, a rod-like liquid crystal compound (TN, STN, IPS or OCB type) and an electrode layer. Each of the substrates has an orientation layer (both-sided orientation layers). The rod-like liquid crystal compound is provided between the orientation layers.

In the liquid crystal cell, the orientation layer activated by light irradiation is still in the experimental stage. Accordingly, the orientation layer of the liquid crystal cell is preferably prepared according to a conventional method, namely by rubbing a polymer (polyimide or polyvinyl alcohol) membrane with a cloth.

The surface of the optically anisotropic layer of the optical compensatory sheet is attached to the surface of the substrate of the liquid crystal cell.

Reference Example 1a

A mixture of the following spiropyran and aminopropyltriethoxysilane (ATS) were subjected to a coupling reaction in dichloromethane in the presence of dicyclohexylcarbodiimide (DCC) while cooling with ice. After precipitation was filtered out, ethanol was added to the mixture to prepare a silyl spiropyran solution to be bound to a surface of a substrate. A washed quartz substrate (12×35 mm) was immersed in the prepared solution at the room temperature for 10 minutes, and heated at 120° C. for 3 minutes. The substrate was wash with an ultrasonic wave in chloroform. Thus, the spiropyran (photochromic compound) was chemically bond to the surface of the quartz substrate.

(Spiropyran)

The surface of the substrate was irradiated with linear polarized light of 365 nm extracted from a high pressure mercury lamp of 500 W (first irradiation). The incident angle of light was 80°, and the angle between the longtitudinal direction of the substrate and the direction from which light emitted was 0°. The light irradiation was conducted for 5 minutes. A 10 wt. % 2-butanone solution a mixture of the following discotic liquid crystal compound and a photo polymerization initiator (Irgacure 907) was coated on the formed orientation layer, and dried. The formed layer was left at 90° C. for 5 minutes. The layer was then irradiated with light of 365 nm from a high mercury lamp of 500 W (second irradiation), and cooled.

(Discotic liquid crystal compound)

The obtained sample was placed on a table, and observed with a polarizing microscope. No schlierene textures were observed in the sample. As the table was rotated, the brightness of the sample was changed. The change of the brightness was periodic. As is evident from these results, the liquid crystal compound was fixed in the form of a mono-domain alignment along a single direction.

Further, the sample was left for three days, and observed with the polarizing microscope in the same manner as is mentioned above. As a result, the same optical characteristics were observed.

Reference Example 1b

The procedures of the reference example 1a were repeated, except that the irradiation of linear polarized light of 365 nm from the mercury lamp (first irradiation) was not conducted.

The obtained sample was placed on a table, and observed with a polarizing microscope. Schlierene textures were observed over the whole surface of the sample. As is evident from the results, the liquid crystal compound was fixed without alignment.

Reference Example 1c

The procedures of the reference example 1a were repeated, except that the second irradiation for the liquid crystal compound was not conducted, and the optically anisotropic layer was formed by cooling the layer quickly.

The obtained sample was placed on a table, and observed with a polarizing microscope. No schlierene textures were observed in the sample. The liquid crystal compound was fixed in the form of a mono-domain alignment along a single direction in the same manner as in the reference example 1a.

Further, the sample was left for three days, and observed with the polarizing microscope in the same manner as is in the reference example 1a. As a result, needle-like crystal phase of multi-domains was formed all over the surface. The optically anisotropic characteristics of the sample had been degraded for 3 days.

Reference Example 2a

The following polyimide was bound to the surface of a quartz substrate.

(Polymide)

The surface of the substrate was irradiated with linear polarized light of 240 to 260 nm extracted from a high pressure mercury lamp of 500 W (first irradiation). The incident angle of light was 80°, and the angle between the longtitudinal direction of the substrate and the direction from which light emitted was 0°. The light irradiation was conducted for 20 minutes. A 10 wt. % 2-butanone solution a mixture of the discotic liquid crystal compound used in the reference example 1a and a photo polymerization initiator (Irgacure 907) was coated on the formed orientation layer, and dried. The formed layer was left at 90° C. for 5 minutes. The layer was then irradiated with light of 365 nm from a high pressure mercury lamp of 500 W (second irradiation), and cooled.

The obtained sample was placed on a table, and observed with a polarizing microscope. No schlierene textures were observed in the sample. As the table was rotated, the brightness of the sample was changed. The change of the brightness was periodic. As is evident from these results, the liquid crystal compound was fixed in the form of a mono-domain alignment along a single direction.

Further, the sample was left for three days, and observed with the polarizing microscope in the same manner as is mentioned above. As a result, the same optical characteristics were observed.

Reference Example 2b

The procedures of the reference example 2a were repeated, except that the irradiation of linear polarized light of 240 to 260 nm from the mercury lamp (first irradiation) was not conducted.

The obtained sample was placed on a table, and observed with a polarizing microscope. Schlierene textures were observed over the whole surface of the sample. As is evident from the results, the liquid crystal compound was fixed without alignment.

Reference Example 2c

The procedures of the reference example 1a were repeated, except that the second irradiation for the liquid crystal compound was not conducted, and the optically anisotropic layer was formed by cooling the layer quickly.

The obtained sample was placed on a table, and observed with a polarizing microscope. No schlierene textures were observed in the sample. The liquid crystal compound was fixed in the form of a mono-domain alignment along a single direction in the same manner as in the reference example 1a.

Further, the sample was left for three days, and observed with the polarizing microscope in the same manner as is in the reference example 1a. As a result, needle-like crystal phase of multi-domains was formed all over the surface. The optically anisotropic characteristics of the sample had been degraded for 3 days.

EXAMPLE 1

(Preparation of Transparent Support)

A transparent polyethersulfone film (thickness: 170 μm) was used as the support. A gelatin undercoating layer (thickness: 0.5 μm) was coated on one side of the transparent support.

(Synthesis of Photo Isomerization Polymer)

Completely saponified polyvinyl alcohol (polymerization degree: 500) and 4-(4-hexylphenylazo)-phenoxyacetyl chloride were dissolved in a mixture of dimethyl formamide and acetone. The solution was heated for 5 hours to synthesize the following photo isomerization polymer in which 16 wt. % of azobenzene units (photochromic compounds) were introduced into polyvinyl alcohol.

(Photo isomerization polymer)

(Formation of Orientation Layer)

To the photo isomerization polymer, glutaraldehyde (0.5 wt. % of the polymer) was added. The mixture was dissolved in a mixture of water and methanol to prepare a 2.5 wt. % solution. The solution was coated on the gelatin undercoating layer, and dried. The formed layer was irradiated with parallel (not polarized) light of 365 nm from an ultra high pressure mercury lamp of 500 W (first irradiation) while heating the layer at 85° C. The incident angle of light was 60°, and the angle between the longtitudinal direction of the substrate and the direction from which light emitted was 45°. The light irradiation was conducted for 5 minute. After the light irradiation, the sample was cooled to form an orientation layer.

(Formation of Optically Anisotropic Layer)

The discotic liquid crystal compound used in the reference example 1a was mixed with a photo polymerization initiator (Irgacure 907, 0.1 wt. % of the discotic liquid crystal compound). The mixture was dissolved in 2-butanone to prepare a 10 wt. % solution. The solution was coated on the orientation layer, and dried. The formed layer was left at 90° C. for 5 minutes. The layer was then irradiated with light of 365 nm from an ultra high pressure mercury lamp of 500 W (second irradiation), and cooled. Thus, an optical compensatory sheet was prepared.

(Evaluation of Optical Compensatory Sheet)

The obtained optical compensatory sheet was sandwiched between crossed two polarizers, and the transmittance was observed. As a result, light was scarcely transmitted where the angle between the axes of the polarizer and the longtitudinal direction of the sheet was 45°. As is evident from the result, the discotic liquid crystal compound was aligned along a direction corresponding to the direction of light irradiation on the azobenzene contained in the orientation layer. Further, number of alignment defect was counted. As a result, the average number of the defect per 1 m² of the sheet was 3. Furthermore, the sheet was left for three days, and observed in the same manner as is mentioned above. As a result, the same optical characteristics were observed.

The optical compensatory sheet was placed between a liquid crystal cell and a polarizing sheet to prepare a liquid crystal display device. The prepared device displayed a clear image having a wide viewing angle and a high contract. Further, distortion or color impurity, which is usually caused by dust was not observed in the image.

Comparison Example 1

The procedures of the Example 1 were repeated, except that the aligning function of the orientation layer was given by not the light irradiation but rubbing the layer with a cloth. The optical characteristics of the prepared optical compensatory sheet were analogous to those of the sheet prepared in Example 1. However, the average number of the defect per 1 m² of the sheet was 7.

Comparison Example 2

The procedures of the Example 1 were repeated, except that the first light exposure was not conducted. The obtained sheet was left at 90° C. for a long term. However, the discotic liquid crystal compound was not aligned at all, and the schlierene textures of the discotic liquid crystal compound still remained.

Comparison Example 3

The procedures of the Example 1 were repeated, except that the second light exposure was not conducted, and the optically anisotropic layer was formed by cooling the layer quickly.

The obtained sheet was observed in the same manner as in Example 1. No schlierene textures were observed in the sheet. The liquid crystal compound was fixed in the form of a mono-domain alignment along a single direction in the same manner as in the Example 1.

Further, the sample was left for three days, and observed in the same manner as is in the Example 1. As a result, needle-like crystal phase of multi-domains was formed all over the surface. The optically anisotropic characteristics of the sheet had been degraded for 3 days.

What is claimed is:

1. An optical compensatory sheet comprising a transparent support, an orientation layer and an optically anisotropic layer in order, said orientation layer containing a light-sensitive polymer, and said optically anisotropic layer containing an aligned and fixed discotic liquid crystal compound, wherein the light-sensitive polymer is a polymer chemically binding a photochromic compound.

2. The optical compensatory sheet as defined in claim 1, wherein the transparent support is made of a plastic film.

3. The optical compensatory sheet as defined in claim 1, wherein the transparent support is made of a continuous film.

4. The optical compensatory sheet as defined in claim 1, wherein the aligned discotic liquid crystal compound is fixed by polymerization.

5. The optical compensatory sheet as defined in claim 1, wherein the aligned discotic liquid crystal compound is in the form of a discotic nematic phase.

6. The optical compensatory sheet as defined in claim 1, wherein the light-sensitive polymer is a hydrophilic polymer chemically binding a photochromic compound.

7. The optical compensatory sheet as defined in claim 6, wherein the light-sensitive polymer is polyvinyl alcohol chemically binding a photochromic compound.

8. The optical compensatory sheet as defined in claim 7, wherein the polyvinyl alcohol is bound to the photochromic compound by a chemical bond of Ph-CO—O-P1 in which Ph is the photochromic compound and P1 is the main chain of the polyvinyl alcohol.

9. A process for the preparation of an optical compensatory sheet, which comprises the steps in order of:

(1) forming a layer containing a light-sensitive polymer on a transparent support, wherein the light-sensitive polymer is a polymer chemically binding a photochromic compound;

(2) irradiating the layer containing the light-sensitive polymer with light applied in a single direction;

(3) forming a layer containing a discotic liquid crystal compound having a polymerizable group and a photo polymerization initiator on the layer containing the light-sensitive polymer; and (4) irradiating the layer containing the discotic liquid crystal compound and the photo polymerization initiator with light.

10. The process defined in claim 9, wherein the transparent support is made of a continuous film.

11. The process defined in claim 9, wherein the layer containing the light-sensitive polymer is irradiated with light applied in a single direction over the layer at the step of (2).

12. The process defined in claim 9, wherein the layer containing the light-sensitive polymer is irradiated with natural light applied in a single direction at the step of (2).

13. The process defined in claim 9, wherein the layer containing the light-sensitive polymer is irradiated with light applied in a single direction while heating the layer at a temperature of 40 to 250° C. at the step of (2).

14. The process defined in claim 9, wherein the layer containing the discotic liquid crystal compound and the photo polymerization initiator is heated at a temperature of 70 to 300° C. between the steps of (3) and (4) or simultaneously with the step of (4).

15. A liquid crystal display comprising a liquid crystal cell, a polarizing sheet and an optical compensatory sheet provided between the liquid crystal cell and the polarizing sheet, wherein the optical compensatory sheet comprises a transparent support, an orientation layer and an optically anisotropic layer in order, said optically anisotropic layer containing an aligned and fixed discotic liquid crystal compound, and said orientation layer containing a light-sensitive polymer, and wherein the light-sensitive polymer is a polymer chemically binding a photochromic compound.

16. The liquid crystal display as defined in claim 15, wherein the liquid crystal cell comprises a pair of substrates, each of which has an orientation layer, a rod-like liquid crystal compound provided between the orientation layers of the substrates and an electrode layer.

17. The liquid crystal display as defined in claim 16, wherein the orientation layer of the liquid crystal cell is formed by rubbing a polyvinyl alcohol or polyimide membrane.

* * * * *